US006792296B1

(12) United States Patent
Van Bosch

(10) Patent No.: US 6,792,296 B1
(45) Date of Patent: Sep. 14, 2004

(54) PORTABLE WIRELESS COMMUNICATION DEVICE AND METHODS OF CONFIGURING SAME WHEN CONNECTED TO A VEHICLE

(75) Inventor: James A. Van Bosch, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 86 days.

(21) Appl. No.: 10/262,159

(22) Filed: Oct. 1, 2002

(51) Int. Cl.[7] .................................................. H04Q 7/20
(52) U.S. Cl. ................................ 455/569.2; 455/569.1; 455/129; 455/99
(58) Field of Search .......................... 455/129, 95, 522, 455/13.4, 345, 575.7, 575.9, 557, 569.1, 569.2, 99

(56) References Cited

U.S. PATENT DOCUMENTS

| | | | |
|---|---|---|---|
| 4,897,644 A | | 1/1990 | Hirano |
| 5,294,915 A | | 3/1994 | Owen |
| 5,406,171 A | | 4/1995 | Moody |
| 5,649,316 A | * | 7/1997 | Prudhomme et al. ........ 455/345 |
| 5,732,335 A | * | 3/1998 | Svensson ................. 455/127.2 |
| 5,754,645 A | | 5/1998 | Metroka et al. |
| 5,842,122 A | | 11/1998 | Schellinger et al. |
| 6,034,593 A | | 3/2000 | Chase et al. |
| 6,049,719 A | | 4/2000 | Schröter |
| 6,091,948 A | | 7/2000 | Carr et al. |
| 6,169,492 B1 | | 1/2001 | Dabbish |
| 6,188,888 B1 | | 2/2001 | Bartle et al. |
| 6,275,500 B1 | | 8/2001 | Callaway, Jr. et al. |
| 6,275,707 B1 | | 8/2001 | Reed et al. |
| 6,337,975 B1 | * | 1/2002 | Coan et al. .................. 455/129 |
| 6,351,653 B1 | | 2/2002 | Alberth, Jr. et al. |
| 6,377,825 B1 | * | 4/2002 | Kennedy et al. .......... 455/569.2 |

OTHER PUBLICATIONS

"Digital Cellular Telecommunications System (Phase 2+); Radio Transmission and Reception" *ETSI EN 300 940*; GSM 04.08 version 7.4.2; 1998, pp. 70, and 380–382.
"Digital Cellular Telecommunications System (Phase 2+); Radio Transmission and Reception" *Draft* GSM 05.05 version 8.4.0 2000, pp. 1–30, 72–75 and 85–89.
"Cell Phone Handsfree Adapter with Built–in FM Radio" Website: http://www.marketunltd.com/cellphone–adapter.html.

(List continued on next page.)

*Primary Examiner*—Erika Gary
*Assistant Examiner*—Huy Nguyen
(74) *Attorney, Agent, or Firm*—Thomas V. Miller; Brian M. Mancini

(57) ABSTRACT

A portable wireless communication device (22) and method for configuring the same when connected to a hands-free system in a vehicle (20). In one embodiment, the device (22) has an interface (36A) and a detector (70A). The interface (36A) is for connecting the wireless communication device (22) to a hands-free control unit (24) in the vehicle (20). The detector (70A) is for determining whether the interface (36A) is connected to the hands-free control unit (24) in the vehicle (20). The wireless communication device (22) may obtain vehicle information from the vehicle (20) when it is determined that the interface (36A) is connected to the hands-free control unit (24). The wireless communication device (22) also configures at least one operation of the wireless communication device (22) based on the obtained vehicle information. For example, the vehicle information may include data associated with a power loss for communicating through an external antenna (40) of the vehicle (20). The operation configured in the wireless communication device (22) would then be adjusting an output power of the wireless communication device (22) based on the data in the vehicle information.

13 Claims, 7 Drawing Sheets

OTHER PUBLICATIONS

"AudioCall Universal FM Radio Hands Free" Website: http://shop.store.yahoo.com/direct/audunhanfref.html.

"Cell Phone Accessories" Website: http://www.expomed.com/consumer/safety/cellphone.htm.

"Universal Hands–Free Car kit" Website: http://cellular–battery.com/info/FM_hands_free.htm.

"Cellected" Website: http://store5.yimg.com/l/cell–accessories_1600_7822870.

* cited by examiner

PORTABLE WIRELESS COMMUNICATION DEVICE AND METHODS OF CONFIGURING SAME WHEN CONNECTED TO A VEHICLE

FIELD OF THE INVENTION

This invention in general relates to hands-free cellular communication systems for vehicles and, more particularly, to a system and method of configuring a portable wireless communication device when the device is connected to a vehicle.

BACKGROUND OF THE INVENTION

Today, many people use portable wireless communication devices in their vehicles. For safety reasons, the industry is focused on providing hands-free features to people who use portable devices in their vehicle. There is a need for better performance and more efficient communications when a portable wireless communication device is connected to a hands-free system of a vehicle.

For instance, a portable wireless communication device may be connected to an external antenna on the vehicle when using the hands-free system. When using an external antenna, however, there may be unacceptable performance due to power losses associated with sending transmissions over vehicle cables that lead to the external antenna. If the power loss from the cables is relatively high, the hands-free system may yield worse performance than if the user simply unplugged the device and held the device to their head. To solve this problem, conventional factory installed hands-free systems use a RF compensator that "compensates" for any power loss due to communicating through the cables leading to the external antenna. Compensators, however, are expensive and contribute significantly to the cost of the entire system. A system and method that eliminates the compensator and yet maintains acceptable performance would provide a significant cost benefit.

Additionally, there is a need for better ways to configure the portable wireless communication device so that it can efficiently communicate with a variety of hands-free systems. For example, in some hands-free systems, the device must be manually configured to forward incoming phone calls to an existing in-vehicle Telematics system such as the OnStar system provided by General Motors. The OnStar system provides hands-free personal voice communications through the audio system of the vehicle. A user, however, must manually forward calls from the portable wireless communication device to a special phone number designated by a system operator. Knowledge of the phone number is necessary. It would be beneficial to eliminate the manual operation of forwarding calls and make the system compatible to different vehicles.

It is, therefore, desirable to provide an improved hands-free cellular communication system and method for dynamically configuring a portable wireless communication device to overcome or minimize most, if not all, of the preceding problems.

Figure 1:
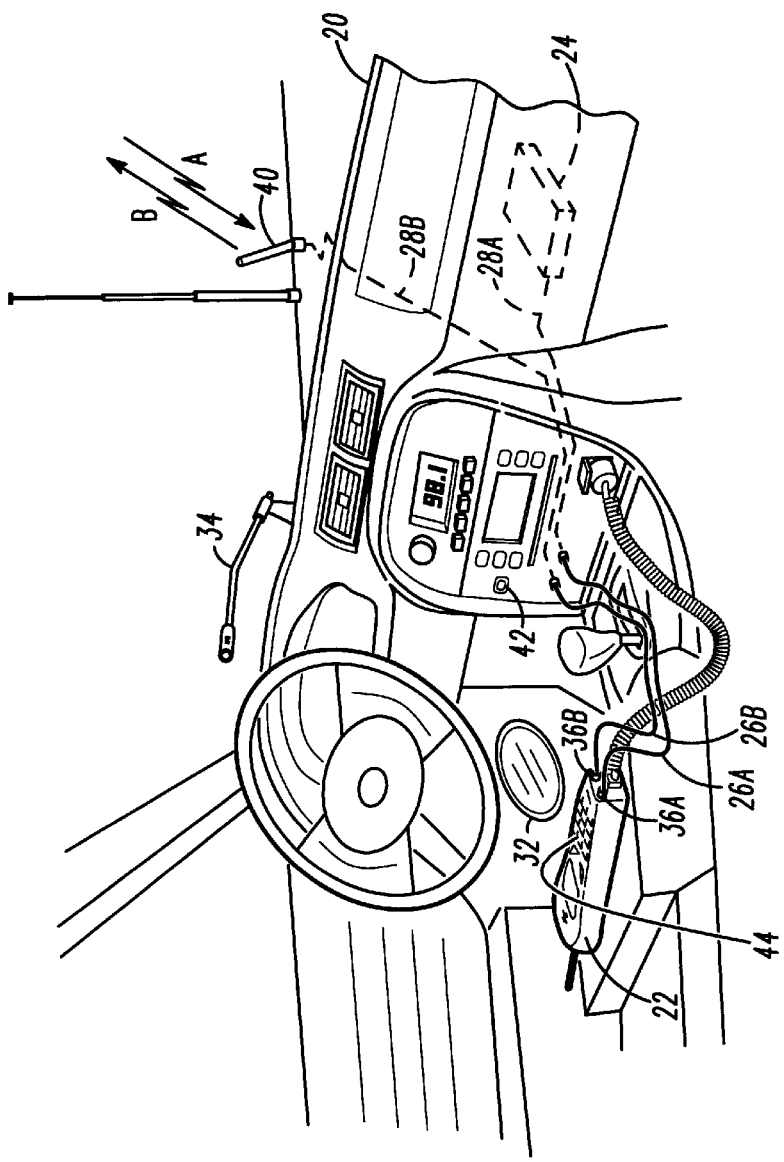
FIG. 1 is a perspective view of a portable wireless communication device and a hands-free control unit in a vehicle according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method of configuring a portable wireless communication device when the device is connected a hands-free control unit in a vehicle. The system and method reduces the cost of the hands-free control unit as well as reduce the complexity of making the portable wireless communication device compatible to different types of vehicles and hands-free systems.

To this end, in one embodiment there is a portable wireless communication device comprising an interface and a detector. The interface is for connecting the wireless communication device to a hands-free control unit in a vehicle. The detector is for determining whether the interface is connected to the hands-free control unit in the vehicle. The wireless communication device obtains vehicle information from the vehicle when it is determined that the interface is connected to the hands-free control unit. The wireless communication device also configures at least one operation of the wireless communication device based on the obtained vehicle information.

For example, the vehicle information may include data associated with a power loss for communicating through an external antenna of the vehicle. The operation configured in the wireless communication device would then be adjusting an output power of the wireless communication device based on the data in the vehicle information.

In another example, the vehicle information may include data associated with a separate vehicle transceiver. The operation configured in the wireless communication device would then be forwarding an incoming call to the separate vehicle transceiver based on the data in the vehicle information. This could be accomplished by notifying the cellular network to forward an incoming call to the number associated with establishing a wireless communication link with the vehicle's embedded cellular transceiver.

In a further example, the vehicle information may include data associated with a vehicle's positioning unit. The operation configured in the wireless communication device would then be adjusting a navigation routine within the wireless communication device to receive positioning information from the vehicle's positioning unit. This could take place if a positioning unit within the wireless communication device has failed.

Another embodiment includes a system for configuring a portable wireless communication device when connected to a vehicle that comprises a vehicle interface, a vehicle detector, and a microcomputer. The vehicle interface is in the portable wireless communication device and is used for connecting the wireless communication device to the vehicle. The vehicle detector is in the portable wireless communication device and is used for determining whether the interface is connected to the vehicle. The microcomputer is also in the portable wireless communication device and used for accessing vehicle information from the vehicle when it is determined that the vehicle interface is connected to the vehicle. The microcomputer is also used for configuring at least one operation of the wireless communication device based on the vehicle information obtained from the vehicle.

A further embodiment includes a portable wireless communication device that comprises a first interface, a second interface, and a microcomputer. The first interface is used for connecting the wireless communication device to a vehicle. The second interface is used for connecting the wireless communication device to an external antenna. The microcomputer has a first and second detector. The first detector is used for determining whether the first interface is connected to the vehicle. The second detector is used for determining whether the second interface is connected to the external antenna. The microcomputer may further be programmed to access data associated with a power loss for communicating through the external antenna and for adjusting an output power of the wireless communication device based on the accessed data. The adjustment occurs when the first detector determines that the first interface is connected to the vehicle and the second detector determines that the second interface is connected to the external antenna.

There is also a method in a portable wireless communication device that comprises the steps of: determining whether the wireless communication device is connected to a vehicle; accessing vehicle information from the vehicle when it is determined that the wireless communication device is connected to the vehicle; and configuring an operation in the wireless communication device based on the vehicle information accessed from the vehicle.

The vehicle information accessed from the vehicle may include data associated with a power loss for communicating through an external antenna of the vehicle. Here, the operation configured in the wireless communication device would then include adjusting an output power of the wireless communication device based on the data in the vehicle information. The vehicle information accessed from the vehicle may also include data associated with communicating with a separate cellular transceiver in the vehicle. The operation configured in the device would then include forwarding an incoming call to the separate cellular transceiver based on the vehicle information. The vehicle information accessed from the vehicle may further include data associated with a positioning unit in the vehicle. The operation configured in the device would then include adjusting a navigation routine within the device to receive positioning information based on the data in the vehicle information.

In another embodiment, there is a method in a portable wireless communication device that comprises the steps of: determining whether the wireless communication device is connected to a vehicle; determining whether the wireless communication device is connected to an external antenna; and if the wireless communication device is connected to the vehicle and the wireless communication device is connected to the external antenna, then obtaining data associated with a power loss for communicating through the external antenna and adjusting an output power for uplink wireless transmissions based on the obtained data. The method may further comprise the steps of: determining whether the wireless communication device is in an active call; and if it is determined that the wireless communication device is not in an active call, then changing a registration of the wireless communication device with a network.

In a further embodiment, there is a method in a portable wireless communication device that comprises the steps of: determining whether the wireless communication device is connected to a vehicle; obtaining vehicle information from the vehicle; determining whether the vehicle has a separate cellular transceiver; and if it is determined that the vehicle has a separate cellular transceiver, then forwarding an incoming call to the separate cellular transceiver in the vehicle based on the vehicle information obtained from the vehicle. The method may further comprise the steps of: if it is determined that the vehicle does not have a separate cellular transceiver, then configuring the portable wireless communication device to transfer audio received in a downlink wireless transmission to the vehicle.

Figure 2:
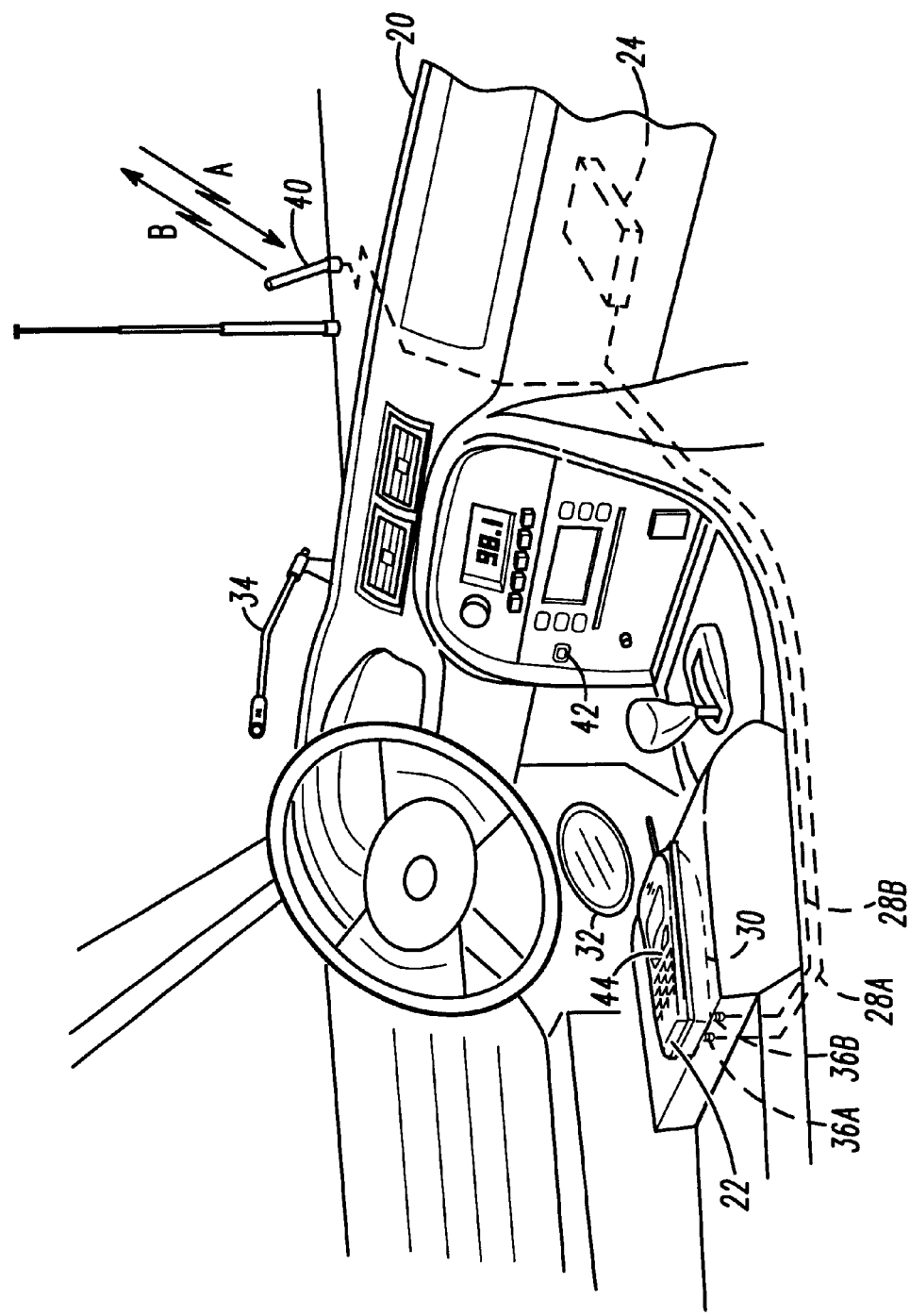
FIG. 2 is a perspective view of a portable wireless communication device and a hands-free control unit in a vehicle according to another embodiment of the present invention.

Now, turning to the drawings, FIGS. 1 and 2 illustrate two embodiments of the present invention for attaching a portable wireless communication device 22 to a hands-free control unit 24 in a vehicle 20. In the embodiment illustrated in FIG. 1, the portable wireless communication device 22 is attached to the hands-free control unit 24 by at least one external communication cord 26A, 26B and at least one internal cable 28A, 28B. In the embodiment illustrated in FIG. 2, the portable wireless communication device 22 is capable of being attached to the hands-free control unit 24 by a receiving cradle 30 in the vehicle 20. Here, the portable wireless communication device 22 is connected directly to the internal cables 28A, 28B at the receiving cradle 30. In either embodiment, the hands-free control unit 24 allows the portable wireless communication device 22 to establish a voice communication through the radio system (including an audio speaker 32 and a microphone 34) in the vehicle 20.

As shown in FIGS. 1 and 2, the portable wireless communication device 22 may have a first interface 36A that is electrically connected to at least a first internal cable 28A. The first internal cable 28A provide connectivity to the hands-free control unit 24. As will be explained later, in some embodiments, the first internal cable 28A may allow the portable wireless communication device 22 to receive vehicle information from the vehicle 20 regarding features of the hands-free system and data associated with those features. Depending on the features of the hands-free system, the first internal cable 28A may also provide the portable wireless communication device 22 with the ability to forward audio from downlink wireless communications A, through the hands-free control unit 24, to the vehicle audio speakers 32. The first internal cable 28A may further provide the portable wireless communication device 22 with the ability to receive audio for uplink wireless communications B, through the hands-free control unit 24, from the vehicle microphone 34.

In certain embodiments, the portable wireless communication device 22 may also have a second interface 36B that is connected to a second internal cable 28B. Here, the second internal cable 28B provides connectivity to an external antenna 40. The external antenna 40 may be attached to the exterior of the vehicle 20 for the purpose of receiving downlink wireless communications A and transmitting uplink wireless communications B. When using an external antenna 40, however, prior systems sometimes require the use of a compensator in the vehicle to provide acceptable wireless communication through the external antenna 40. The in-vehicle compensator used in known systems "compensates" for any power losses during the transmission of communications through the second internal cable 28B. As mentioned earlier, however, compensators are expensive and contribute significantly to the cost of the entire system. As will be explained in more detail below, the present invention provides a significant cost advantage because it eliminates the need for an in-vehicle compensator through the access of vehicle configuration information. The vehicle configuration information may then be used by the portable wireless communication device 22 during call set-up to configure the device.

In one embodiment, the operator of the vehicle 20 may initiate a call set-up by activating a switch 42 on the vehicle when the operator desires to place an outgoing cellular voice communication or when the operator desires to accept an incoming cellular voice communication. Alternatively, the operator of the vehicle may initiate a call set-up by activating a switch on the user interface 44 of the portable wireless communication device 22.

The interaction between the portable wireless communication device 22 and the vehicle 20 will now be explained in the context of FIGS. 3 and 4. The difference between these two figures is that the hands-free system in FIG. 3 relies upon the connection between the portable wireless communication device 22 and the vehicle 40 to transfer audio for uplink and downlink wireless communications. The hands-free system in FIG. 4 includes a separate cellular transceiver 50 in the vehicle 40. The vehicle cellular transceiver 50 shown in FIG. 4 is used for uplink and downlink wireless communications through the radio system.

Figure 3:
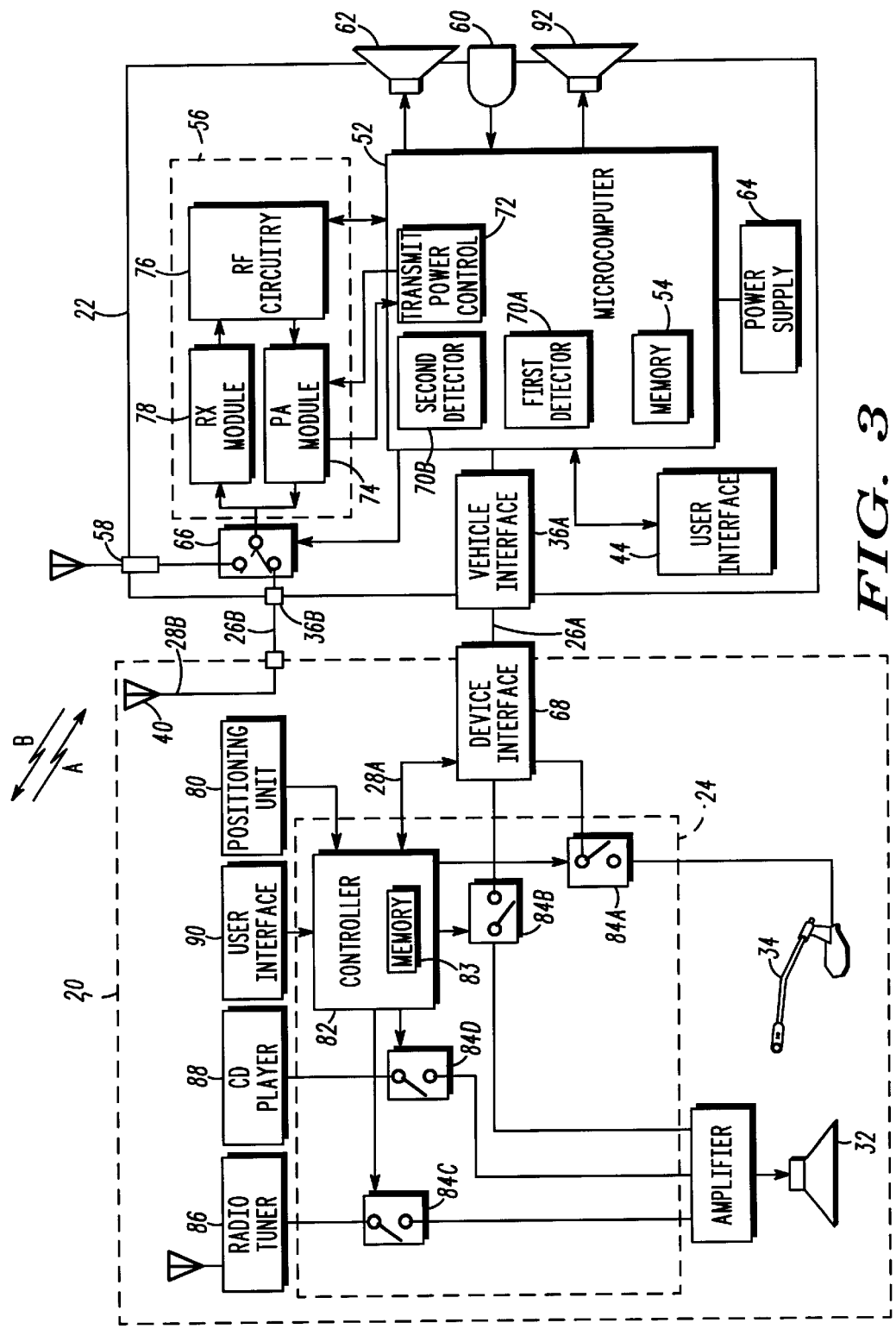
FIG. 3 is a block diagram of a portable wireless communication device connected to a vehicle according to one embodiment of the present invention.
Figure 4:
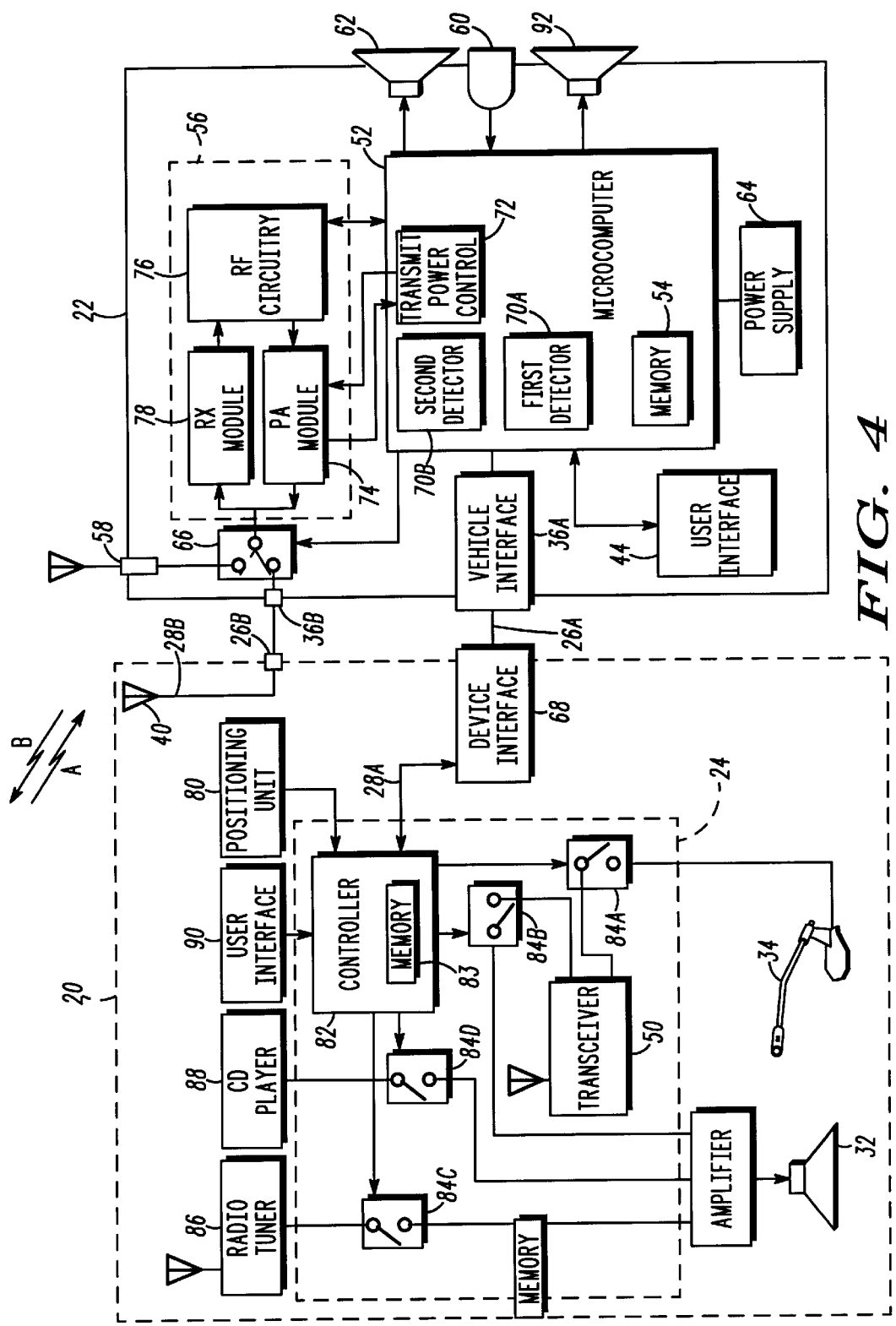
FIG. 4 is a block diagram of a portable wireless communication device connected to a vehicle according to another embodiment of the present invention.

FIGS. 3 and 4 illustrate a portable wireless communication device 22 in the form of a cellular phone capable of transmitting and receiving cellular voice communications. In this embodiment, the portable wireless communication device 22 may include microcomputer 52, a memory 54, a first (or a vehicle) interface 36A, a second (or an external antenna) interface 36B, a cellular transceiver 56, an internal antenna 58, an internal microphone 60, an internal speaker 62, a user interface 44, and a power supply 64. The wireless communication device 22 may further include other circuitry such as switches (including an antenna switch 66) for interconnecting the components within the wireless communication device 22. The switches may be controlled by the microcomputer 52. The microcomputer 52 and memory 54 may also be referred to as a controller of the device 22 and, preferably, includes a digital microprocessor.

As will be explained in more detail below, prior to or during call set-up, the microcomputer 52 of the portable wireless communication device 22 may include a first vehicle detector 70A to determine whether the first interface 36A is connected to the hands-free control unit 24. In one embodiment, the first detector 70A may include a circuit that monitors one of the communication lines that may be connected to the first interface 36A in the first internal cable 28A. If the monitored communication line is temporarily connected to ground, then the first detector 70A determines that the first interface 36A of the portable wireless communication device 22 is connected to the hands-free control unit 24.

As will also be discussed in more detail below, the portable wireless communication device 22 may further include a second detector 70B to determine whether the portable wireless communication device 22 is properly connected to the external antenna 40. In one embodiment, the external antenna may contain a resistor in the base of the antenna whip. The second detector 70B may include circuitry that detects the presence of the resistor in the base of the antenna whip. Alternatively, the second detector 70B may include circuitry to monitor a conductor within the internal cable 28B to see if it is grounded. The conductor being grounded when connected to the external antenna 40. One of ordinary skill in the art having the benefit of this disclosure will realize that there may be many other ways to design a circuit to detect the presence of the external antenna 40. What is important is that the detector 70B verifies that an electrical connection exists between the antenna interface 36B of the device 22 and the external antenna 40.

Referring initially to FIG. 3, in response to detecting and receiving an activation signal or other indicator for a call set-up, the portable wireless communication device 22 may send the audio from downlink communications A to the vehicle audio speakers 32 via the first (or a vehicle) interface 36A. In one embodiment, the system includes an external communication cord 26A that connects the first (or vehicle) interface 36A in the portable wireless communication device 22 to a device interface 68 in the vehicle 20. This arrangement is further illustrated in FIG. 1. In another embodiment, the system may eliminate the external communication cord 26A by simply providing a receiving cradle 30 for docking the portable wireless communication device 22 to the vehicle 20. This embodiment was further illustrated previously in FIG. 2. In either case, what is important is that there is a communication connection between the portable wireless communication device 22 and the hands-free system in the vehicle 20.

The communication connection between the portable wireless communication device 22 and the vehicle 20 may serve a variety of purposes. First, it may be important for some operations to determine whether the portable wireless communication device 22 is actually connected to a hands-free communication system within the vehicle 20. For example, if the portable wireless communication device 22 is a portable phone, it must be designed to comply with relevant national and international standards and guidelines regarding exposure to radio frequency electromagnetic energy (EME). There are different power classes for wireless devices. Portable phones that operate next to a person's body (handheld portable devices) are generally limited to certain maximum RF power limits specified according to one class or set of power control levels. Other cellular communication devices (such as transportable or vehicular mounted units or devices) are permitted to operate at higher power limits specified according to another class or set of power control levels.

The present invention takes advantage of the differences in classes or sets of power control levels to overcome any power losses that may occur when a device 22 operates through an external antenna 40. The present invention provides an efficient way, through a new configuration scheme in the wireless communication device 22, to advantageously eliminate the need of a costly in-vehicle compensator that now exist in hands-free systems. Accordingly, it may be important, in some applications, to determine whether the portable wireless communication device 22 is actually connected to the hands-free communication system in the vehicle 20.

Second, the communication connection may be important, in some embodiments (such as the one shown in FIG. 3), in providing the portable wireless communication device 22 with the ability to receive audio from a vehicle microphone 34 for uplink wireless communications B. The hands-free control unit 24 may be configured to provide the capability of switching, transferring, or otherwise routing the audio from the vehicle microphone 34 to the portable wireless communication device 22 for the uplink wireless communications B.

Third, the communication connection may be important, in some embodiments (such as the one shown in FIG. 3), to provide the portable wireless communication device 22 with the ability to broadcast audio to a vehicle speaker 32 from downlink wireless communications A. The hands-free control unit 24 may be configured to provide the capability of switching, transferring, or otherwise routing the audio to the vehicle speakers 32 from the portable wireless communication device 22.

Fourth, the communication connection in some embodiments may be important to the portable wireless communication device 22 for receiving vehicle information so that the device 22 can configure certain operations prior to or during call set-up. For example, in one embodiment of the present invention, the portable wireless communication device 22 receives information from the vehicle 20 prior to or during the setup of a call. The vehicle information may include features available in the hands-free system in the vehicle 20 and data associated with configuring the portable wireless communication device 22 to use those features. The vehicle information could be stored in a memory 83 of a controller 82 of the hands-free control unit 24.

For instance, in one case, the vehicle information may include an identification of whether the vehicle 20 has an external antenna 40 and data associated with using the external antenna 40. Data associated with using the external antenna 40 could include power loss information related to sending communications across the internal cable 28B that interconnects the portable wireless communication device 22 and the external antenna 40. The portable wireless communication device 22 would then use any received data to configure or otherwise adjust the output power of the device in the cellular transceiver 56 with a gain nominally equal to the loss of the internal cable 28B. Moreover, the type of data obtained or accessed by the device 22 should provide data of the in-vehicle cable loss of the system for each frequency band. Thus, the device 22 will know what the in-vehicle cable loss is and can accurately adjust for the cable loss at all desired frequency bands.

In one embodiment, each vehicle may have its own data associated with a power loss. This power loss needs to be accounted for by the portable wireless communication device 22. Accordingly, the portable wireless communication device 22 may check whether the device is actually connected to the external antenna 40 and, if so, increase its output power for uplink wireless communications to account for the power loss based on the vehicle information.

To perform this operation, the microcomputer 52 may include transmit power microcomputer 72 that is capable of adjusting a power amplifier (PA) module 74 within the cellular transceiver 56 with a gain nominally equal to the loss of the internal cable 28B. The cellular transceiver 56 may include radio frequency (RF) circuitry 76, a receiver (RX) module 78 for receiving downlink wireless transmissions, and the PA module 74 for transmitting uplink wireless transmissions. The adjustment made by the transmit power microcomputer 72 only affects the output power for uplink wireless transmissions. It is noted that this should be an acceptable limitation, however, because most cellular phone systems are uplink limited.

In another case, to further highlight the benefits of the present invention, referring to FIG. 4, the vehicle information may include an identification of whether the vehicle has a separate embedded cellular transceiver 50 within the vehicle 20 and data regarding the operation of the vehicle's embedded cellular transceiver 50. The data regarding the operation could include the phone number of the vehicle's embedded cellular transceiver 50. The portable wireless communication device 22 could then use the phone number to automatically notify the cellular network to forward an incoming call to the phone number of the vehicle's embedded cellular transceiver 50. The vehicle's embedded cellular transceiver 50 would then be capable of receiving and transmitting cellular communications through the radio system (including an audio speaker 32 and a microphone 34) in the vehicle 20.

Referring to both FIGS. 3 and 4, in a further case, the vehicle information may include an identification of whether the vehicle 20 contains an existing positioning unit 80 such as a Global Position System (GPS) unit. This would inform the portable wireless communication device 22 to configure or otherwise adjust any navigation functions within the portable wireless communication device 22 so that it may receive position information from the positioning unit 80 in the vehicle 20. The position information received from the positioning unit 80 in the vehicle 20 could then be used by the portable wireless communication device 22 to perform enhanced navigation operations. For instance, the received position information could be used when a failure occurs with a positioning unit (not shown) within the portable wireless communication device 22. The received position information could further be used in combination with a positioning unit within the portable wireless communication device 22 to provide an integrated (and more accurate) position location solution.

The portable wireless communication device 22 may be set up to interface with different types of hands-free systems. In general, systems typically have a hands-free control unit 24 that is configured to control hands-free functions within the vehicle 20. For example, the hands-free control unit 24 may include a controller 82 and a plurality of switches 84A, 84B, 84C, 84D. Referring to the embodiment illustrated in FIG. 3, the controller 82 may be connected to a switch 84A to provide the ability to switch, transfer, or otherwise route the audio for uplink wireless communications B from the vehicle microphone 34 to the portable wireless communication device 22. The controller 82 may be further connected to a switch 84B to provide the ability to switch, transfer, or otherwise route the audio of downlink wireless communications A from the portable wireless communication device 22 to the vehicle speakers 32. In another type of hands-free system, referring to FIG. 4, the controller 82 may be connected to a switch 84A to provide the ability to switch, transfer, or otherwise route the audio for uplink wireless communications B from the vehicle microphone 34 to the vehicle cellular transceiver 50. The controller 82 may be further connected to a switch 84B to provide the ability to switch, transfer, or otherwise route the audio of downlink wireless communications A from the vehicle cellular transceiver 50 to the vehicle speakers 32.

The hands-free control unit 24, in either embodiment, may further be connected to peripheral input devices of the radio system of the vehicle 20 such as a radio tuner 86 and a CD player 88 through switches 84C, 84D. This allows the hands-free control unit 24 to mute the input devices during a phone conversation over the radio system. The hands-free control unit 24 may also be connected to a user interface 90 (that includes switch 42) to receive information such as whether to initiate a call set-up.

In one embodiment, the switch 42 on the user interface 90 of the vehicle is capable of initiating an activation signal or other indicator to the portable wireless communication device 22. Sending a signal or other indicator to the controller 82 of the hands-free control unit 24 can do this. In response to receiving the signal from the switch 42, the hands-free control unit 24 would then be capable of sending an activation signal or other indicator to the portable wireless communication device 22. In one embodiment, the activation signal or indicator to the wireless communication device 22 can be done by temporarily grounding a communication line (such as the transmit, or microphone, line) in the external communication cord 26A. The portable wireless communication device 22 would have the capability of detecting the temporary ground in the line through circuitry further included in the first detector 70A. This would inform the portable wireless communication device 22 that the user would like to accept an incoming call or place a new outgoing call.

The microcomputer 52 within the device is configured according to known methods to monitor the cellular transceiver 50 for pending incoming cellular voice communications. Upon receiving a pending voice communication, the microcomputer 52 may notify the operator of a pending voice communication via an audio alert in a speaker 92. The microcomputer 52 would then determine whether the vehicle operator agrees to accept the voice communication. In one embodiment, the microcomputer 52 may make this determination by waiting for a predetermined time period to detect whether the hands-free control unit 24 transmits an activation signal or other indicator. As mentioned above, in one embodiment, the activation signal may be temporarily grounding a communication line (such as the transmit, or microphone, line) in the external communication cord 26A. The portable wireless communication device 22 would have the capability of detecting the temporary ground in the line through circuitry within the first detector 70A. In an alternative embodiment, the microcomputer 24 may make this determination by waiting for a predetermined period to detect whether the user has selected a button on the user interface 44 of the portable wireless communication device 22. If the pending incoming voice communication is not accepted, then the microcomputer 52 can do nothing and let the voice communication transfer to an electronic voice answering service. Alternatively, the microcomputer 52 can respond to the voice communication by sending a special message to the incoming caller that the operator of the vehicle is not able to respond to the call at this time.

If the microcomputer 52 determines that the pending incoming voice communication is accepted (an activation signal or other indicator has been detected or received), then the microcomputer 52 must set up the call. In one embodiment, the microcomputer 52 will obtain or access data regarding certain vehicle information obtained from the vehicle 20 or obtained from its own memory 54. The portable wireless communication device 22 will then use the obtained or accessed vehicle information to configure the device 22.

In one embodiment, the hands-free control unit 24 will transfer vehicle information to the portable wireless communication device 22 at the time the device is plugged into the vehicle 20. The received vehicle information may be stored in memory 54 of the portable wireless communication device 22. The stored vehicle information would then be made available to the device at the time of call setup (or sooner) for purposes of configuring the device. In another embodiment, the portable wireless communication device 22 accesses the vehicle information from the vehicle 20 at or during the time of call setup. In this case, the vehicle information is stored in memory 83 of the controller 82 and accessed after it is determined that the first interface 36A is connected to the vehicle 20. In a further embodiment, the portable wireless communication device 22 accesses its own memory 54 having a database that stores information regarding different types of vehicles and hands-free systems. The portable wireless communication device 22 determines the type of vehicle and hands-free system and then access vehicle information stored in the database.

After the portable wireless configuration device 22 obtains or otherwise accesses the vehicle information, the device 22 will then configure the operations of the device 22 based on data in the vehicle information. For example, as mentioned above, the vehicle information may contain information on whether the vehicle 20 has an external antenna 40 and data associated with a power loss for communicating through the external antenna 40. The wireless communication device 22 would configure the output power for uplink wireless transmissions B based on the obtained data after it is determined that the external antenna 40 is connected to the second interface 36B of the device 22. The microcomputer 52 has the capability of controlling an antenna switch 66 that switches the connection of the cellular transceiver 56 between the device's internal antenna 58 and the vehicle's external antenna 40.

In one embodiment, the transmit power microcomputer 72 increases or otherwise adjusts the output power at the RF power amplifier (PA) module 74 of the cellular transceiver 56 with a gain nominally equal to the loss of the internal cable 28B. The information regarding the loss is contained in the vehicle information obtained or accessed by the device 22. Preferably, the vehicle information should specify a cable power loss of the system for each frequency band. Thus, the device 22 will know what the in-vehicle cable loss is and can accurately adjust for the cable loss at all of the desired frequency bands. The transmit power microcomputer 72 may receive feedback regarding the output level at the PA module 74.

In another example, also mentioned above, the vehicle information may contain information on whether the vehicle 20 has a separate cellular transceiver 50 in the vehicle 20 and data associated with the operation of the cellular transceiver 50. The data associated with the operation of the transceiver 50 may include a phone number for wirelessly communicating with the transceiver 50. Here, the wireless communication device 22 could use the data to forward incoming calls to the phone number specified in data.

In a further example, also mentioned above, the vehicle information may contain information on whether the vehicle 20 has a positioning unit 80 such as a GPS unit and data associated with the operation of the positioning unit 80. This would inform the portable wireless communication device 22 to configure or otherwise adjust any navigation functions within the portable wireless communication device 22 so that it may receive position information from the positioning unit 80 in the vehicle 20.

As one of ordinary skill in the art will appreciate, additional configuration information could be obtained or transferred between the portable wireless communication device 22 and the vehicle 20 at or prior to call setup to aid in configuring the device 22 when it is connected to a vehicle 20. The present invention reduces the cost of a hands-free system in the vehicle as well as reduces the number of steps in answering and placing voice communications. With a single push of a button, the wireless communication device 22 is configured based on data received from the vehicle 20 prior to or during the time of call set-up. The vehicle radio system is then configured to receive downlink audio and send uplink audio of the voice communication.

Figure 5:
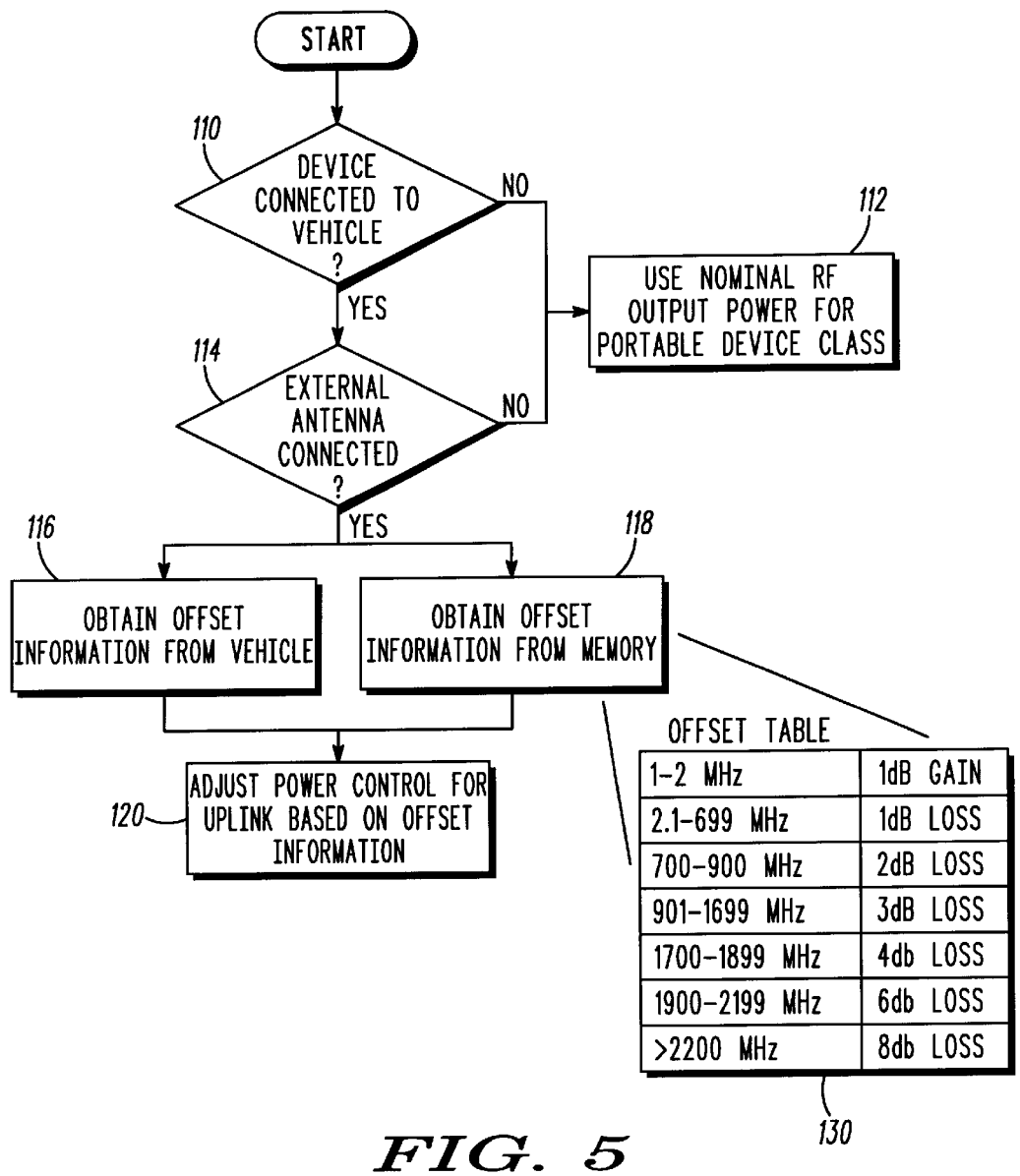
FIG. 5 is a flow diagram of a method to configure a portable wireless communication device according to one embodiment of the present invention.

In one embodiment, the portable wireless communication device 22 includes a processor in the microcomputer 52 that implements software stored in the memory 54. FIG. 5 illustrates one embodiment of a method that may be implemented by using the configuration scheme set forth in the above discussion. This method uses vehicle information that would include data associated with a power loss for communicating through the external antenna 40 in the vehicle 20.

The method begins at decision block 110 where the portable wireless communication device 22 determines whether the device 22 is connected to the vehicle 20. This may include determining whether the device 22 is connected to the hands-free control unit 24. This could be done through the use of a first detector 70A in the device 22. The first detector 70A may include circuitry within the device 22 that monitors one of the communication lines connected to the device 22 via the first interface 36A. If the monitored communication line is temporarily connected to ground, then the first detector 70A would determine that the device 22 is connected to the vehicle 20. If the device 22 is not connected to the vehicle 20, then the method proceeds to block 112 where the device 22 would use the nominal RF output power for the power class specified for handheld portable devices. For example, a GSM 1900 MHz Mobile Station (MS) handheld portable device (Power Class 1) must conform to a nominal maximum output power of 1 W (30 dBm) with a tolerance for normal conditions of +/−2 dBm. [GSM 05.05 version 8.4.0 Release 1999, Section 4.1.1] The process then returns to decision block 110 where the device 22 waits for a change in a condition such as the device 22 being connected to the vehicle 20.

If the portable wireless communication device 22 is determined to be connected to the vehicle 20, then the method proceeds to decision block 114. At decision block 114, the process determines whether an external antenna 40 is connected to the portable wireless communication device 22. This may be important for some devices because one does not want to just increase the output power for uplink wireless transmissions unless it is verified that the external antenna 40 is available and properly connected to the device 22. If the device 22 is not connected to the external antenna 40, then the device 22 would use nominal RF output power for its class of portable device. Again, the process then returns to decision block 114 where the device 22 waits for a change in a condition such as the device 22 being connected to the external antenna 40.

If the portable wireless communication device 22 is determined to be connected to the external antenna 40, then the method may proceed to either process block 116 or 118, depending on the implementation. At process block 116, the device 22 obtains data, such as power offset information, from the vehicle 20. This could be done by having the device 22 obtain or access information from the hands-free control unit 24 through the first interface 36A of the device 22. For instance, the device 22 could access memory 83 within the controller 82. Alternatively, at process block 118, the device could obtain data, such as power offset information, from its own memory 54. The data could be contained in memory 54 in a number of ways. For instance, vehicle information could be transferred to memory 54 of the device 22 at the time the device 22 is connected to the vehicle 20 via the first (or vehicle) interface 36A. Alternatively, the memory 54 of the device 22 could be previously stored with data regarding a variety of types and makes of vehicles as well as types and makes of hands-free systems. Furthermore, the data stored in memory 54 could be done through a database or look-up table. For purposes of illustration, an example of a database or look-up table is shown in table 130 of FIG. 5. In particular, the data can be stored in memory 54 according to a plurality of frequency bands.

After process blocks 116, 118, the method proceeds in one embodiment to process block 120 where the portable wireless communication device 22 adjusts its output power for uplink wireless transmissions based on the data obtained in process blocks 116 or 118. At this point, the device 22 may proceed to establishing a link for transmitting and receiving wireless transmission through the cellular transceiver 56. The process may be set up to end or, alternatively, return to the first decision block 110 and wait for a change in a condition.

Figure 6:
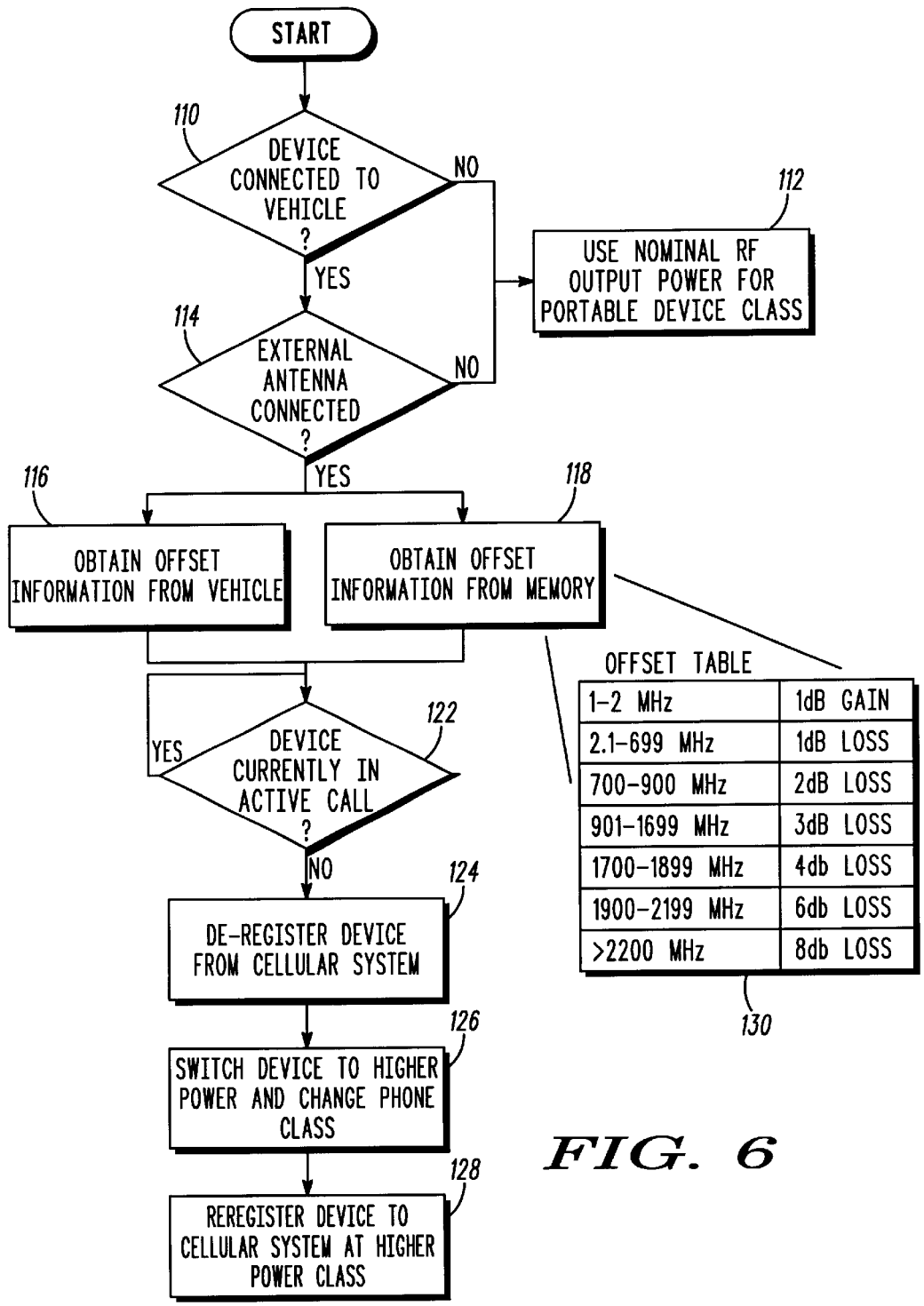
FIG. 6 is a flow diagram of another embodiment of a method to configure a portable wireless communication device according to the present invention.

FIG. 6 illustrates another embodiment of a method that may be implemented by using the present invention. Again, this method uses vehicle information that would include data associated with a power loss for communicating through the external antenna 40 in the vehicle 20. Here, the decision blocks 110, 114 and process blocks 112, 116, 118 are the same as those described in relation to FIG. 5. Again, for purposes of illustration, an example of a database or look-up table is shown in table 130. The method, however, may alternatively account for whether the device 22 is currently in an active call before making any power adjustments.

For instance, at decision block 122, the method may make a determination of whether the portable wireless communication device 22 is already currently in an active call. This may occur when a person is on an active call but plugs the device 22 into the vehicle 20 or connects the device 22 to an external antenna 40. If the device 22 is in an active call, no adjustments to the power will be made and the process returns until the active call is completed. When the device 22 is not in an active call, the method proceeds to process block 124. Here, the device 22 is deregistered from a connected base station system or other network that it may be currently registered. This may be important in some wireless protocols where a base station system or other network commands the device 22 to change from one power control level to another power control level within a type of device class.

The process then proceeds to block 126 where the device 22 switches to higher output power and changes to a different device class or set of higher order power levels. For instance, there exist within the GSM standard one set of power control levels for a class pertaining to handheld portable devices (Power Class 1). There also exists another set of power control levels for a class that is restricted to transportable or vehicular mounted units or devices (Power Class 3). As mentioned earlier, a GSM 1900 MHz Mobile Station (MS) handheld portable device (Power Class 1) must conform to a nominal maximum output power of 1 W (30 dBm) with a tolerance for normal conditions of +/−2 dBm. A GSM 1900 MHz Mobile Station (MS) vehicular mounted device (Power Class 3) must conform to a nominal maximum output power of 2 W (33 dBm) with a tolerance for normal conditions of +/−2 dBm. [GSM 05.05 version 8.4.0 Release 1999, Section 4.1.1] Accordingly, in one embodiment, the method includes switching from a device class pertaining to handheld portable devices to a class pertaining to vehicular mounted devices after it is determined that the device is connected to the vehicle and to an external antenna.

Then, the process proceeds to block 128 where the device 22 re-registers the device to the connected base station system or other network at the different power class so that the device may operate at a different (and preferably higher order) set of power control levels. The process may then end or, alternatively, return to the first decision block 110 to await a change in condition.

Figure 7:
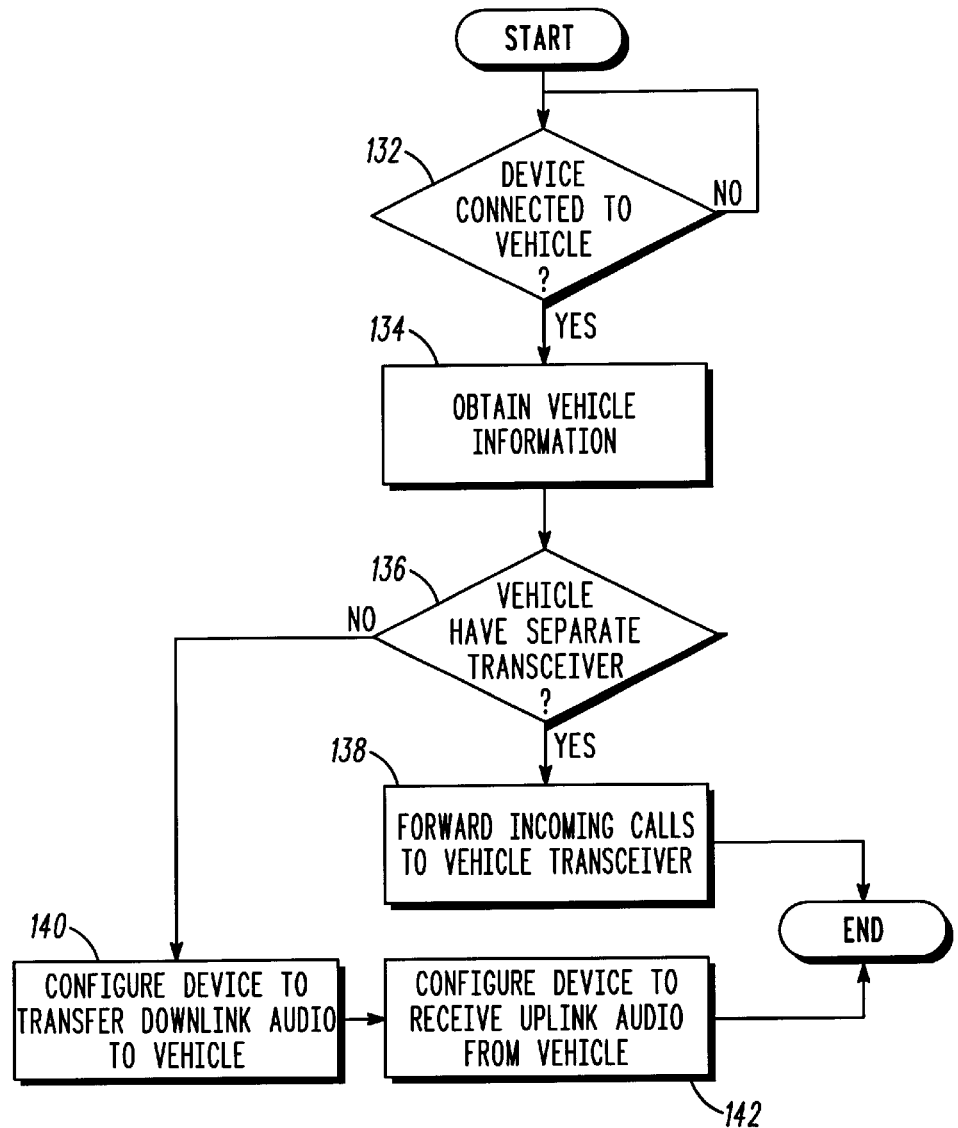
FIG. 7 is a flow diagram of a further embodiment of a method to configure a portable wireless communication device according to the present invention.

FIG. 7 illustrates a further embodiment of a method that may be implemented by using the present invention. This method, however, uses vehicle information that would include an identification of whether the vehicle has a separate cellular transceiver 50 within the vehicle 20 and data regarding the operation of the vehicle cellular transceiver 50. The data regarding the operation of the vehicle could include a phone number that is associated with wirelessly communicating with the vehicle cellular transceiver 50.

The method may start at decision block 132 where a determination is made whether the device 22 is connected to the vehicle 20. This could include determining whether the device 22 is connected to the hands-free control unit 24. This could be done through the use of a first detector 70A in the device, as discussed in more detail above. If the device 22 is not connected to the vehicle 20, then the process will stay at the decision block 132 until a determination is made that the device 22 is connected to the vehicle 20. When a determination is made that the device 22 is connected to the vehicle 20, then the process continues to block 134.

At block 134, the process may include a step of obtaining vehicle information from the vehicle 20. Here, the device 22 may obtain data, such as whether the vehicle 20 contains its own cellular transceiver 50 and, if so, data associated with communicating with the transceiver 50. This could be done by having the device 22 obtain or access information from the hands-free control unit 24 through the first interface 36A of the device 22. Alternatively, the device could obtain data from its own memory that was previously obtained or entered into the device 22. The process then proceeds to decision block 136.

At decision block 136, a determination is made whether the vehicle includes a separate transceiver 50. This could be done by looking at the vehicle information obtained at process block 134. If the vehicle 20 does contain a separate transceiver 50 (such as the one shown in FIG. 4), then the process continues to block 138 where the device 22 configures itself to forward incoming calls to the vehicle transceiver 50. This could include notifying the cellular network to forward an incoming call to the phone number of the vehicle's embedded cellular transceiver 50. The data for forwarding the call may be accessed from the vehicle information obtained in process block 134. The process may then end or, alternatively, continue with further steps for canceling the call forwarding configuration when it is detected that the device 22 is no longer connected to the vehicle 20.

If the vehicle 20 does not contain a separate transceiver 50 (such as the one shown in FIG. 3), then the process may continue to blocks 140 and 142. At block 140, the device 22 is configured to transfer audio from the downlink wireless communications A to the vehicle speakers 32 via the first interface 36A. At block 142, the device 22 may then be configured to receive audio for the uplink wireless communications B from the vehicle microphone 34 via the first interface 36A. The process may then end or, alternatively, continue with further steps for canceling the configuration when it is detected that the device 22 is no longer connected to the vehicle 20.

What has been described is a system and method for configuring a portable wireless communication device when the device is connected to the vehicle. The system and method reduces the cost, complexity and the number of distractions when answering or establishing a cellular communication. The above description of the present invention is intended to be exemplary only and is not intended to limit the scope of any patent issuing from this application. The present invention is intended to be limited only by the scope and spirit of the following claims.

What is claimed is:

1. A system for configuring a portable wireless communication device when connected to a vehicle, the system comprising:

a vehicle interface in the wireless communication device for connecting the wireless communication device to the vehicle;

a vehicle detection circuit in the wireless communication device for determining whether the interface is connected to the vehicle; and a microcomputer in the wireless communication device for accessing vehicle information from the vehicle when it is determined that the vehicle interface is connected to the vehicle and for establishing from the vehicle information whether there is a separate embedded cellular transceiver in the vehicle, wherein if a separate vehicle's embedded cellular transceiver is present subsequently determining the telephone number of the separate vehicle's embedded cellular transceiver from the vehicle information; and forwarding a call to the portable wireless communication device to the phone number of the separate vehicle's embedded cellular transceiver.

2. The system in claim 1, wherein the vehicle information includes data associated wit a power loss for communicating through an external antenna of the vehicle and the at least one operation configured in the wireless communication device includes adjusting an output power of the wireless communication device based on the data in the vehicle information.

3. The system in claim 1, wherein the microprocessor detects whether a call is incoming to the separate vehicle's embedded cellular transceiver and further comprising a user interface of the portable communication device for choosing whether to accent the call to the separate cellular transceiver through the portable communication device.

4. The system in claim 1, wherein the vehicle information includes data associated with a vehicle positioning unit, the at least one operation configured in the wireless communication device includes adjusting a navigation routine within the wireless communication device to receive positioning information from the vehicle positioning unit.

5. The system in claim 1, wherein the system further comprising an antenna interface and an antenna detector, the antenna interface for connecting the wireless communication device to an external antenna, the antenna detector for deter whether the wireless communication device is attached to the external antenna.

6. The system in claim 5, wherein the system adjusts an output power of the wireless communication device based on the obtained vehicle information when it is determined that the antenna interface is connected to the external antenna, the output power associated with sending a communication via the external antenna.

7. A method in a portable wireless communication device, the method comprising the steps of:
   determining whether the wireless communication device is connected to a vehicle;
   accessing vehicle information from the vehicle when it is determined that the wireless communication device is connected to the vehicle; and
   establishing from the vehicle information whether there is a separate embedded cellular transceiver in the vehicle, wherein:
      if a separate vehicle's embedded cellular transceiver is present further comprising the substeps of:
         determining the telephone number of the separate vehicle's embedded cellular transceiver from the vehicle information; and
         forwarding a call to the portable wireless communication device to the phone number of the separate vehicle's embedded cellular transceiver.

8. The method in claim 7, wherein the vehicle information accessed from the vehicle includes data associated with a power loss for communicating through an external antenna of the vehicle.

9. The method in claim 8, wherein the operation configured in the wireless communication device includes adjusting an output power of the wireless communication device based on the data in the vehicle information.

10. The method in claim 7, further comprising the substep of:
   detecting by the portable communication device whether a call is incoming to the separate vehicle's embedded cellular transceiver, and
   choosing whether to accept the call to the separate vehicle's embedded cellular transceiver through the portable communication device.

11. The method in claim 10, wherein the the choosing substep includes waiting a predetermined period for choosing to accept the call wherein if the period expires the portable communication device directs a voice communication transfer to a voice answering service and if the call is accepted before the period expires the portable communication device sets up the call.

12. The method in claim 7, wherein the vehicle information accessed from the vehicle includes data associated with a positioning unit in the vehicle.

13. The method in claim 12, wherein the operation configured in the wireless communication device includes adjusting a navigation routine within the wireless communication device to receive positioning information based on the data in the vehicle information.

* * * * *